Feb. 13, 1934.    O. U. ZERK    1,947,147
LEVER
Filed April 12, 1932
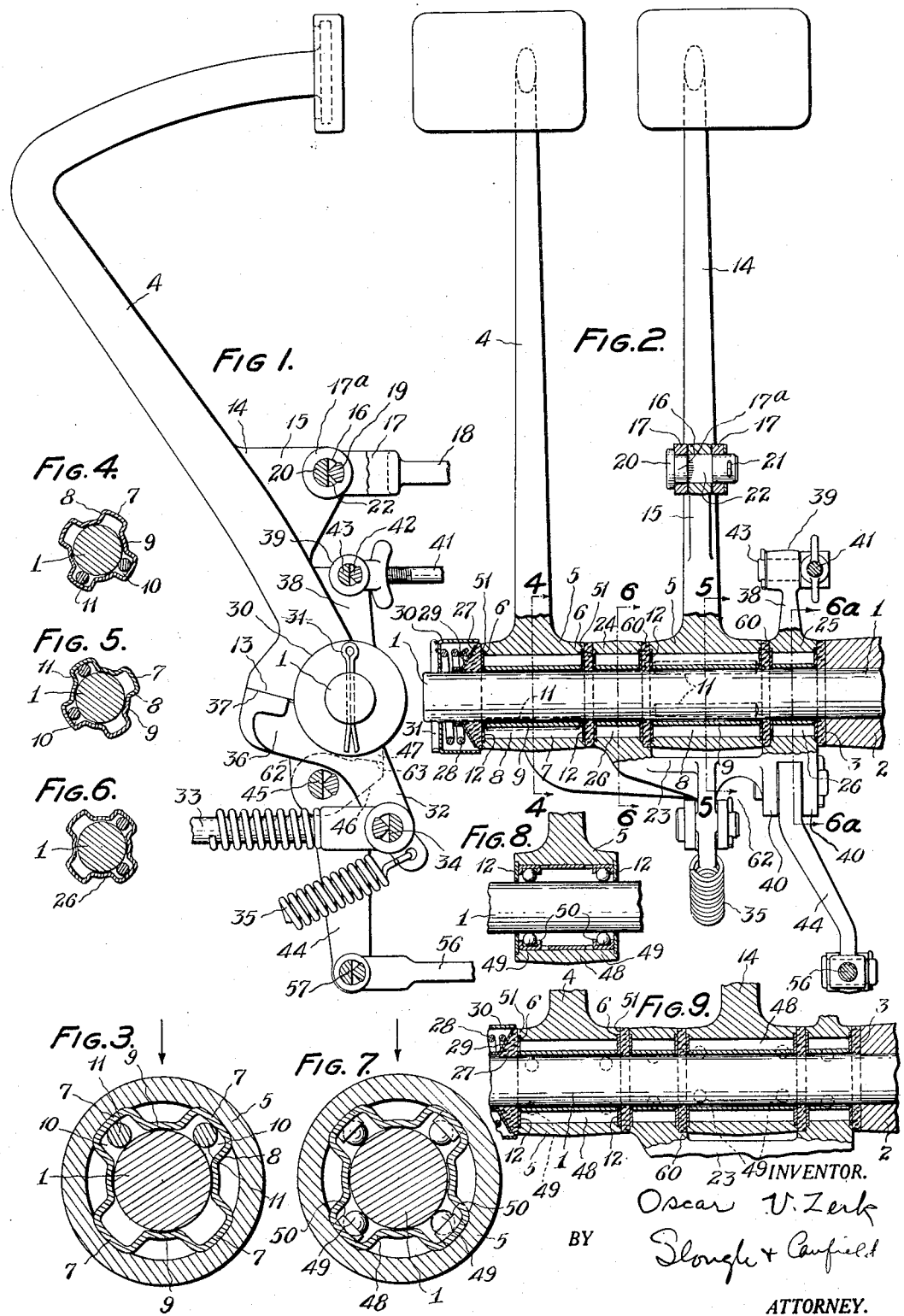

Patented Feb. 13, 1934

1,947,147

UNITED STATES PATENT OFFICE

1,947,147

LEVER

Oscar U. Zerk, Cleveland, Ohio

Application April 12, 1932. Serial No. 604,778

12 Claims. (Cl. 308—189)

My invention relates to levers in general, and more particularly to pivoted levers arranged in multiple on a shaft and provided with relatively non-friction bearings requiring little or no lubrication. I further employ relatively non-friction bearings at points spaced from the axis of the lever for rockingly engaging elements adapted to transmit motion to or receive motion from the levers.

It is an object of my invention therefore, to provide an improved lever mechanism provided with improved non-friction bearings. Another object of my invention is to provide an improved lever mechanism, wherein the bearing elements will be effectively sealed against the entry of foreign substances such as grit and dust.

Another object of my invention is to provide an improved lever mechanism, comprising a plurality of levers rockingly mounted on a shaft wherein the lever bearings will be effectively sealed against the ingress of foreign substances by packings applied in an improved manner.

Another object of my invention is to provide an improved lever mechanism comprising a plurality of levers rotatable on a common shaft, with improved bearing elements provided for the levers and mounted as to most efficiently sustain the thrust of pressures exerted between the shaft and the levers.

Another object of my invention is to provide an improved lever mechanism comprising a plurality of levers mounted on a common shaft, and provided with substantially self-centering bearing elements adapted to efficiently sustain the thrusts exerted between the shaft and levers.

Another object of my invention is to provide an improved lever mechanism comprising a plurality of levers mounted on a common shaft, the parts of which are susceptible of relatively inexpensive manufacturing and assembling operations.

Another object of my invention is to provide an improved lever mechanism comprising a plurality of levers mounted on a common shaft, wherein the levers will exert pressure thereagainst from various relatively angular directions, and providing bearing elements having bearing parts angularly directed as to operate most efficiently under the pressure effects so angularly directed.

Another object of my invention is to provide bearing means for levers, wherein the bearing contact is had over a relatively limited surface requiring little or no lubrication but if lubricated, operative over very long periods with the minimum of lubricant.

Another object of my invention is to provide improved bearing means for levers wherein the bearing contact is exerted over a limited surface preferably along substantially lines of engagement, and wherein the bearing elements are relatively oscillatable substantially about said line of contact as an axis to insure a very low amount of friction between the engaged bearing parts, whereby the lubrication required will be very considerably reduced over present constructions commonly in use for the purpose.

Another object of my invention is to ensure that the lubricant applied to the bearings is uncontaminated by dust and dirt securing ingress to the bearing surfaces and is not lost prior to the expiration of the useful life of the mechanism served by the bearing.

Another object of my invention is to provide improved bearing means for a control lever system of an automotive vehicle.

Other objects of my invention and the invention itself will be more apparent to those skilled in the art to which my invention appertains by reference to the following description of certain embodiments of my invention which are illustrated in the accompanying drawing, wherein, Fig. 1 is a side elevational view of a system of levers embodying my invention comprising the brake and clutch levers of an automobile and associated parts;

Fig. 2 is a front elevational view partially in section of the levers illustrated in Fig. 1;

Fig. 3 is an enlarged cross sectional view showing the manner of mounting the bearing housing in the head of a lever, and wherein I employ roller bearing elements;

Fig. 4 is a section taken along the lines 4—4 of Fig. 2 showing the relative position of the shaft and the bearing elements;

Fig. 5 is a section taken along the lines 5—5 of Fig. 2 illustrating the relative position of the shaft and the bearing elements for the brake lever;

Fig. 6 is a section taken along the lines 6—6 or 6a—6a of Fig. 2 illustrating the relative location of the shaft and the bearing elements employed in mounting the cooperating clutch release means;

Fig. 7 is a sectional view taken transversely of the shaft showing a modification of my invention, wherein I employ ball bearings;

Fig. 8 is a sectional view taken vertically and axially of the shaft showing the manner of controlling the lateral movement of the balls illustrated in Fig. 7; and Fig. 9 is a fragmentary sectional view taken longitudinally of the shaft showing the relative positioning of the ball bearing elements around the shaft.

The embodiment of my invention illustrated in the drawing is applied to the purpose of effecting the foot pedal control functions of an automotive vehicle, there being illustrated in the drawing and previously described a pair of levers rotatable on a common shaft, one being the usual brake lever for the automobile and the other being the usual clutch lever, these levers being arranged for the purposes and substantially in the manner wherein such levers are found on the current model of Buick automobile, whereby the so-called "master control" system is effected, such "master control" system being very well known at the present time to those skilled in this art.

In this "master control" system, as usually applied, the brake and clutch levers as well as the auxiliary levers are journaled in such a way that after any considerable period of use, the frictional contact between the levers and the shaft means on which the levers are journaled is excessive, so that more and more effort must be exerted by the operator to accomplish the operation of the levers, which as illustrated are joined to brake and clutch mechanism through link rods as described, and which are the same as the corresponding rods in the said well known "master control" system.

It is to be understood, however, that my invention is not limited to the so-called "master control" system, but may be applied to any and all levers which are provided with bearings at their fulcrums or elsewhere and in some of its aspects is directed particularly to the provision of a plurality of such levers arranged in parallel proximity in association with a common supporting shaft.

Referring to the drawing—

A preferably cylindrical shaft 1, which is preferably rigidly supported by an automotive vehicle chassis, a fragment of which is shown at 2, and is rigidly and non-rotatably secured thereto by any suitable means such as keying. The support 2 is preferably provided with a faced shoulder 3. A clutch lever generally indicated at 4 is provided with a tubular hub or fulcrum portion 5 telescoped over the shaft 1. The end faces for the tubular fulcrum 5 are provided with recesses as at 6 to provide short annular projections 51.

A tubular sheet metal bearing casing 8 of generally cruciform cross-sectional shape with four equally spaced radially extending channels 7 interconnected by intermediate arcuate webs 9 and is telescoped over the shaft 1 and within the tubular fulcrum 5, and is non-rotatably secured in the fulcrum tube by having the peripheral portions of said channels indentured within longitudinally extending grooves of the fulcrum tube.

The inner surfaces of the webs 9 generally define a cylinder slightly greater in diameter than that of the shaft 1, so as to provide a clearance between said webs and said shaft 1. Elongated roller bearing elements 11 are disposed in at least some of the channels 7, and each being disposed to effect bearing contact simultaneously with the shaft 1 and the inner bearing surface of the end wall of its associated channel. Each of the rollers is adapted for free rolling movement within the said channels to an extent limited by the width of the channels. Sheet metal washers 12 are pressed into the recesses 6 of the fulcrum end walls, and serve to take the end thrusts of the bearing rollers 11.

The lever 4 is provided with an integral lug 13 which when the lever is rotated on the shaft 1 makes engagement with a faced surface 37 of a laterally extending arm 36 of a clutch actuating element 62, whereby when the clutch lever 4 is rotated the lug 13 thereof will engage the said faced surface 37 of the arm 36 to actuate the clutch actuating element 62 and the associated rod 33 against the tension of the spring 35.

The clutch lever 4 is thus freely rotatable about the shaft with the intermediately disposed roller bearings 11, rolling on the shaft surface in a position substantially parallel to the shaft axis, and will only actuate the clutch releasing mechanism when moving in a counter-clockwise direction as viewed from Fig. 1. I preferably only employ two roller bearing elements 11 positioned on each side of the shaft against which the force is directed and substantially equidistant from the normal direction of application of the said force.

A conventional brake lever generally indicated at 14, is mounted in a manner similar to that described for clutch lever 4 and is generally similar thereto with the exception that a hinge type bearing is provided for engaging the brake lever 14 with the brake actuating rod rather than a faced engaging lug as provided for the clutch lever. A generally triangular shaped lug 15 is provided on the brake lever 14 at a spaced distance from the axis thereof, which is provided with a generally cylindrical aperture 16 and faced bosses surrounding the said aperture and adapted to provide engaging faces for forks 17 of a brake rod 18. The aperture 16 which is cylindrical for approximately three-quarters of its circumference is provided with a recessed concentric aperture in the remaining portion within which is disposed a knife edge sector 19.

The forks 17 are provided with aligned apertures 17a coaxial with apertures 16 and have disposed therein a headed pin 20 which abuts the outer face of one of said forks and are secured by a cotter pin 21 abutting the outer face of the opposite fork and thereby retaining the pin in place.

The pin 20 intermediate the fork 17 is cut away substantially along a diameter thereof to form the planular bearing surface 22, and substantially semi-cylindrical faces which slidingly engage the end faces of a bearing sector 19 disposed therebetween. The pin 20 and the knife edge sector 19 are preferably formed of hardened rustless or stainless chromium steel thus ensuring a negligible tendency toward abrasion or rust to disturb the generally substantially line contact substantially at the axis of the pin between the pin bearing surface 22 and the knife edge sector 19. The rod 18 will thus engage the lever 14 through relatively non-frictional bearing elements and the lever 14, freely rotatable about the shaft 1, will transmit a braking effort to the rod 18, through the medium of the knife edge bearing, described.

A clutch actuating element generally indicated at 62, comprises a generally horizontal base portion 23 provided at each end with integral upstanding parallel eyes 24 and 25 encircling the shaft 1, the eye 24 encircling the shaft intermediate the hub or fulcrum portion of clutch lever 4 and brake lever 14, and the eye 25 encircling the shaft intermediate the hub 5 of brake lever 14 and a shaft support 2.

The eyes 24 and 25 are provided with a bearing casing 26 generally similar to the previously described bearing casing 8 and non-rotatably secured therein in a like manner. Lower bearing elements similar to the elements 11 previously described with the exception of being relatively shorter are secured within the casing 26 and prevented from relative lateral movement by washers 6 which are tightly secured in annular recesses provided therefor in the eyes 24 and 25. It will thus be observed that the clutch actuating element 22 is rockingly secured to the shaft 1 at two spaced points.

Preferably annular packing ring elements 60 encircle the shaft 1 and are disposed intermediate the eyes 24 and 25 of element 22 and the hub portions 5 of clutch lever 4 and brake lever 14 and intermediate the inner face of eye 25 and the face 3 of the shaft support 2.

A preferably frusto-conical shaped packing element abuts the outer face of hub portion 5 of lever 4 as indicated at 27 and is wedgingly secured against the said face and the shaft surface by a normally compressed spring 28 which preferably seats at one end against a frusto-conical shaped sheet metal element 29 and at its opposite end against an apertured sheet metal cup 30, which substantially encloses the packing ring 27, the element 29 and the spring 28. The cup 30 is telescoped over the shaft end, and held in compressive relation with the spring 28 by a pin 31 inserted through an aperture extending through the end of the shaft 1.

The spring 28 exerts pressure on the packing ring 27 which is transmitted serially to the various packing elements 26, thereby effectively sealing the bearing elements against the ingress of abrasive foreign substances.

The clutch actuating element 62 is provided substantially centrally thereof with a forwardly and downwardly extending lever arm 32 integrally secured to the base 23. Lever 32 is rockingly secured to a clutch actuating rod 33 by a knife edge type bearing generally indicated at 34 and previously described in connection with the brake rods and brake lever engaging means.

The lever 32 is also provided with an aperture adjacent the end thereof wherein is secured one end of the spring 35, the other end being suitably secured to a fixed support (in a manner not shown). The clutch actuating element 62 is further provided with a rearwardly and laterally extending arm 36 provided with a faced surface 37 against which the lug 13 of clutch lever 4 is adapted to press to actuate the clutch actuating element 62 and the associated rod 33, against the tension of the spring 35.

By referring to Fig. 4 it will be observed that the lower bearing elements 11 are so positioned as to oppose the thrust of the clutch lever 4 against the shaft and that since there will be relatively little pressure therebetween when the lever is not being actuated it is not necessary to provide bearing elements other than on the side of the shaft against which the pressure is directed, as the roller bearing elements 11 together with the arcuate portion 9 of the casing provides sufficient bearing surface for relative non-frictional operation at other times.

When the clutch lever 4 is being actuated against the tension of spring 35 the housing will obviously be forced away from the shaft at the side opposite which the pressure is applied and obviates any tendency or friction therebetween, therefore not requiring roller bearing elements at this side of the shaft unless desired.

By referring to Fig. 3 it will be observed that as the lever and associated housing are rotated relative to the shaft, that the bearing elements 11 will roll on the shaft surface and thereby approach the lateral walls of the channels 7 of the bearing casing 8. The roller bearings 11, under normal operating conditions, will not roll sufficiently to engage the side walls of the channel and in case of extreme angular movement would be permitted to slide relative to the shaft and will tend to return to normal position when the force thereon is removed. A second means of actuating clutch element 62 and thereby rod 33 to disengage the clutch is provided, and for this reason, the clutch actuating element 62 is provided with a generally vertical lever arm 38 having a hub 39, and is also provided with the downwardly extending generally triangular spaced forks 40. A rod 41 connected to a selector valve plunger, (not shown) is rockingly secured to the hub 39 of lever 38 by a preferably knife edge bearing generally designated at 42 which is generally similar to the knife edge bearing previously described with the exception that a single element engaging the pin 43 is employed rather than a dual or fork connection as previously described. The forks 40 have a lever arm 44 rockingly disposed therebetween by a knife edge type bearing generally indicated at 45 and is provided with a forwardly extending faced lug 46 adapted to engage a pad 47 integral with the clutch actuating element 62, whereby the clutch may be disengaged.

The lower end of lever 44 is rockingly secured to a rod 56 by a knife edge type bearing generally indicated at 57 and previously described, the rod 56 being connected to a vacuum operated diaphragm (not shown).

The clutch control mechanism is designed to provide a dual means of releasing or engaging the clutch in a manner well understood in the art. Normally the clutch will be operated by the foot pedal 4, through the lug 13 thereof engaging the face 37 of the clutch actuating element 62 and thereby relatively actuating the clutch release rod 33 against the tension of the spring 35. When the foot pedal is used the lever 44 will pivot away from the member 62 and will not be affected in any manner by the rocking of the member 62. At preferably idling speed the vacuum diaphragm is operated through association with the intake manifold of the car and thereby actuates rod 46 causing the face lug 46 of lever 44 to engage pad 42, clutch actuating element 62 and thereby disengage clutch against the tension of spring 35. Lever 41 is connected to a selector valve plunger whereby the vacuum means will be rendered non-effective to release the clutch under conditions where desired to use the foot pedal or normal means of operation. This is usually controlled by advancing the throttle to a point beyond the effective range of the vacuum means.

In Figs. 7, 8 and 9, I have illustrated another embodiment of my invention generally similar to that described wherein I replaced the roller bearings with ball bearings disposed adjacent either end of the bearing casing. A bearing casing 48 generally similar to bearing casing 8 is secured within the hub portions 5 of the levers 4 and 14 in a manner previously described. Ball bearing elements 49 rather than roller bearing elements are employed and disposed preferably in parallel plane engagement at each end of the housing and secured against lateral movement by downwardly projecting lugs 50, preferably formed integral with the sheet metal bearing casing 48.

As will be observed by referring to Fig. 9, the relative positioning of the ball bearings at each end of the bearing housing is the same, or in other words, a line projected through one ball bearing parallel to the shaft axis would pass through the ball bearing at the opposite end of the casing in substantially the same relative points. It will further be noticed that as previously explained, the ball or roller bearings throughout are disposed intermediate the shaft and the bearing casing in such a position as to oppose the force directed against the shaft surface and are generally equally spaced from the normal center line of such directed force.

Although I have shown and described embodiments of my invention I contemplate that numerous and extensive departures may be made therefrom without departing from the spirit of my invention and appended claims. Having thus described my invention, what I claim is:

1. A lever mechanism comprising a lever provided with a fulcrum portion having a transverse bore, a fulcrum shaft projected through said bore, a plurality of rolling bearing elements disposed intermediate the walls of said bore and said shaft and making rolling engagement with the shaft, means retaining all of said bearing elements in operative positions always at one side of a plane including the shaft axis, from which side of the shaft the operative thrust of said lever against said fulcrum shaft is directed.

2. The lever mechanism substantially as described in claim 1, characterized by the provision of annular resilient packing means encircling the shaft and engaging a lateral surface of said lever fulcrum portion, and spring means compressing said packing means simultaneously radially inwardly against the shaft and longitudinally against said lever fulcrum portion bordering an end of the bore, to substantially operatively seal the bore.

3. The lever mechanism substantially as described in claim 1, wherein said rolling bearing elements comprise elongated rollers having their axes disposed substantially parallel to said shaft and to each other.

4. The lever mechanism substantially as described in claim 1, wherein said rolling bearing elements comprise a plurality of longitudinally spaced pairs of bearing balls, the balls of both sets being disposed substantially in planes parallel to the shaft axis and to the plane of the other set.

5. The lever mechanism substantially as described in claim 1, wherein said rolling bearing elements comprise a plurality of longitudinally spaced pairs of bearing balls, the balls of both sets being disposed substantially in planes parallel to the shaft axis and to the plane of the other set, and disposed at the same side of the shaft axis so as to jointly equally oppose the normal direction of the pressure exerted against said shaft by the lever.

6. A lever mechanism comprising a cylindrical shaft, a lever provided with a hub portion encircling the shaft, a bearing casing relatively non-rotatably secured within the said hub portion, bearing elements disposed within said casing and adapted to roll circumferentially of the shaft surface, means for restraining movements of the bearing elements longitudinally of the shaft, said casing comprising means for limiting the circumferentially rolling action of the said bearing elements, said casing holding the bearing elements within an acute angle formed by planes converging to intersect at the shaft axis.

7. In combination with a supporting shaft, a mechanism comprising a plurality of mechanism elements each having a bored hub forming a mechanism element fulcrum each telescoped by its hub successively on the supporting shaft and longitudinally shiftable thereon, a plurality of substantially annular packing washers telescoped over said shaft making abutting sealing engagement therewith and with annular end surfaces of all of said mechanism elements, a spring effecting compressive stress against all of said washers and all of said mechanism elements in relative serial relation, whereby said mechanism elements may be shifted longitudinally and said packing washers pressed thereby simultaneously into increased compressive engagement with the shaft and the annular ends of said mechanism element hub portions to seal the bores of said hub portions.

8. A lever mechanism comprising a cylindrical shaft, a lever provided with a hub encircling the shaft, a bearing casing secured within the said hub, said casing comprising a plurality of longitudinally extending channels joined by intermediate curved webs, said webs adapted to loosely engage the shaft surface, bearing elements adapted to roll circumferentially of the shaft and disposed within certain of said channels at the same side of the shaft, the channel walls being so disposed as to limit the rolling movements of said bearing elements, said casing formed to engage said bearing elements to restrain longitudinal movements thereof, packing washers encircling the shaft, and spring pressed means compressing said packing washers to simultaneously effect a seal between the shaft and hub to restrain the ingress of foreign substances to the interior of the hub.

9. The lever mechanism substantially as described in claim 8, characterized by said hub being interiorly grooved longitudinally of its bore and said bearing casing being interlocked with the walls of the hub groove.

10. The lever mechanism substantially as described in claim 8, characterized by said lever hub being bifurcated to form a pair of longitudinally spaced hub portions, and spring pressed packing washers encircling the shaft and engaging said shaft and the opposing surfaces of said portions.

11. A mechanism comprising a cylindrical shaft, a plurality of spaced mechanism elements provided with hub portions encircling the said shaft and longitudinally shiftable thereon, bearing elements disposed within the hub portions and adapted to roll circumferentially on the shaft surface, packing elements encircling the shaft outwardly of and intermediate the mechanism element hub portions, and a single operative means for resiliently compressing the packing elements against the hub portions of shaft surface to serially longitudinally displace the packing elements and mechanism elements to effect a seal of all the hub interiors.

12. A mechanism comprising a cylindrical shaft, a plurality of spaced mechanism elements provided with hub portions encircling said shaft and longitudinally shiftable thereon, bearing elements disposed within the hub portions and adapted to roll circumferentially of the shaft surface, annular packing elements comprising portions engaging the shaft, one encircling the shaft intermediate the mechanism element hub portions, a fixed one of said packing elements abutting the innermost said mechanism element hub portion, another of said packing elements abutting the outermost of said mechanism element hub portions, and spring means fixed relative to the shaft adapted to longitudinally shift the hub portions to compressively engage the outermost packing element and transmitting pressure through the intermediately disposed hub portion to the intermediately disposed packing element.

OSCAR U. ZERK.